（12）United States Patent
Liu

(10) Patent No.: US 8,233,085 B1
(45) Date of Patent: Jul. 31, 2012

(54) METHOD AND SYSTEM FOR INTERPOLATING A PIXEL VALUE OF A PIXEL LOCATED AT AN ON-SCREEN DISPLAY

(75) Inventor: Yi Liu, San Ramon, CA (US)

(73) Assignee: Kolorific, Inc., Milpitas, CA (US)

( * ) Notice: Subject to any disclaimer, the term of this patent is extended or adjusted under 35 U.S.C. 154(b) by 371 days.

(21) Appl. No.: 12/633,280

(22) Filed: Dec. 8, 2009

(51) Int. Cl.
*H04N 7/01* (2006.01)

(52) U.S. Cl. .................. 348/441; 348/452; 348/459

(58) Field of Classification Search .................. 348/441, 348/443, 445, 446, 448, 451, 452, 458, 459, 348/699–701; 375/240.16, 240.22, 240.24; *H04N 7/01, 11/20, 5/14, 9/64*
See application file for complete search history.

(56) References Cited

U.S. PATENT DOCUMENTS

| | | |
|---|---|---|
| 6,219,436 B1 | 4/2001 | De Haan et al. |
| 6,385,245 B1 | 5/2002 | De Haan et al. |
| 7,010,039 B2 | 3/2006 | De Haan et al. |
| 2007/0229703 A1 * | 10/2007 | Lu .................. 348/441 |

* cited by examiner

*Primary Examiner* — Sherrie Hsia
(74) *Attorney, Agent, or Firm* — Dergosits & Noah LLP; Joyce Tom

(57) ABSTRACT

A method for interpolating a pixel value of a pixel located at an OSD object during frame rate conversion includes determining current forward motion vectors between a first previous video frame and a current video frame, and at least one other set of forward motion vectors between two temporally consecutive previous video frames. The method also includes determining that a block adjoining a target block includes pixels depicting at least a portion of an OSD object. The method also includes determining that a position of the adjoining block relative to the target block coincides with a direction of a current forward motion vector associated with the target block, setting a magnitude of the current forward motion vector to zero (0), and calculating a pixel value of a pixel in the target block in the interpolated video frame based on the current forward motion vector associated with the target block.

15 Claims, 4 Drawing Sheets

METHOD AND SYSTEM FOR INTERPOLATING A PIXEL VALUE OF A PIXEL LOCATED AT AN ON-SCREEN DISPLAY

FIELD OF THE INVENTION

The present invention relates in general to digital image and video signal processing and in particular to a method and system for pixel interpolation at an on-screen display (OSD) during frame rate conversion of a video signal.

BACKGROUND

World wide analog video standards, such as NTSC and PAL, use interlaced video formats to maximize the vertical refresh rates while minimizing the required transmission bandwidth. In an interlaced video format, a source video frame includes a plurality of pixels that are arranged in a plurality of horizontal scan lines. Each frame is split into two video fields of opposite parity. The first of the two fields includes the pixels located in the odd numbered horizontal scan lines, and is referred to as an odd parity field, while the second field includes the pixels located in the even numbered scan lines, and is referred to as an even parity field.

Well known techniques, such as 3:2 pull-down or 2:2 pull-down, are used to break an original progressive frame into interlaced video fields while maintaining a compatible frame rate. For example, the 3:2 pull-down technique is used when the source, i.e., original, video signal has a frame rate of 24 frames/sec and the transmission rate of the interlaced video signal is 60 fields/sec. A first source frame is converted into three (3) fields, two of which have the same parity, and a second source frame is converted into two fields of opposite parity. By converting the first and second source frames in this manner, five (5) fields are transmitted at a rate of 60 fields/sec for every two (2) frames received at a rate of 24 frames/sec, thereby maintaining compatible frame/field rates. The interlaced video fields are transmitted sequentially in temporal order to a display system, thereby minimizing the transmission bandwidth.

An exemplary progressive video signal display system, e.g., a television (TV) or a projector, is illustrated in FIG. 1A. As is shown, the display system 20 includes a signal receiving unit 22 that is coupled to a tuner box 24, and a video decoder 28. Signals, such as television signals comprising interlaced video fields, are captured by the signal receiving unit 22 and transmitted to the tuner box 24. The tuner box 24 includes a converter 25 and a demodulation unit 26 that transforms the incoming signal into an analog signal. The analog signal 27 is received by the video decoder 28, which outputs an interlaced video signal 29 corresponding to the interlaced video fields.

The display of interlaced video fields by the display system 20 can produce undesirable visual artifacts, such as line flicker and line crawling. The visual artifacts can be minimized and the appearance of an interlaced image can be improved by de-interlacing the fields to convert them into a progressive format. Accordingly, a video processing unit 30 typically receives the interlaced video signal 29 and de-interlaces the interlaced video signal 29 to generate a progressive video output signal 32 corresponding to the de-interlaced video frames.

The progressive video output signal 32 can be transmitted to a display 34 for presentation. Nonetheless, high definition displays 34, such as LCD TVs, require a display frequency of at least 120 frames/sec. Accordingly, additional frames must be created and inserted between input frames to achieve a display frequency of at least 120 frames/sec. For example, the following table indicates the number of additional frames needed for typical input frame rates.

TABLE A

| Input (source) frame rate (frames/sec) | Number of Additional Frames Inserted Between Input Frames |
| --- | --- |
| 24 | 4 |
| 30 | 3 |
| 60 | 1 |

A frame rate converter (FRC) unit 33 is typically used to change the output frame rate so that the progressive video signal 32 can be scanned at the display frame rate of at least 120 frames/sec. In one technique, certain frames are merely copied and inserted between input frames to achieve the requisite display frequency. This technique, however, results in undesirable visual artifacts, such as, motion judder and blurring.

In another technique, the FRC unit 33 is configured to add frames by interpolating pixels values in an interpolated frame based on pixel information of temporally neighboring frames, e.g., temporally preceding and proceeding frames. For example, in one approach, a pixel value in the interpolated frame can be determined based on one or both of corresponding pixels in a preceding (previous) frame and a proceeding (current) frame. While this approach is simple and may be effective when objects in the scene are stationary, it can produce visual artifacts when objects in the scene are in motion.

In another approach, the current frame can be divided into a grid of contiguous blocks comprising a matrix of pixels. For each block in the current frame, a forward motion vector can be determined between a block in the previous frame and a matching block in the current frame. For example, the matching block in the previous frame can be identified by comparing the pixel values in a block in the current frame with pixel values in the blocks in the previous frame. When a block in the previous frame includes pixel values that match those pixel values in the block in the current frame, the matching block is determined and a forward motion vector, pointing from the block in the previous frame to the matching block in the current frame, can be generated, as illustrated in FIG. 1B.

After motion estimation and if no scene change is detected, frame interpolation can be performed using the forward motion vectors generated for each block. Film mode detection will tell how many frames need be interpolated between the current and previous frames. If N frames will be interpolated, then each forward motion vector can be scaled $1/(N+1)$ times, and the scaled forward motion vectors can be used to interpolate each pixel in each interpolated frame. For example, in FIG. 1B, one (1) frame is interpolated and the forward motion vector is scaled by one-half ($\frac{1}{2}$) so that the matched block in the interpolated frame is positioned in a location at the middle of the forward motion vector. All blocks in the previous frame can be matched to blocks in the current frame in this way in raster scan order, and corresponding interpolated blocks can be placed in the interpolated frame.

In some cases, however, it is not desirable to have a portion of the interpolated frame to be filled with pixels interpolated from a scaled forward motion vector. For example, conventional pixel interpolation can produce undesirable visual effects when the frame content includes an on-screen display (OSD) object that is superimposed on the frame content. Such OSD objects can be, for example, a graphical logo of a product, and a closed captioning block. In this case, when a pixel at or near an OSD object is interpolated using the scaled forward motion vector, the edge of the OSD object in the interpolated frames can become blurred and/or distorted. Because the human eye is particularly sensitive to variations along sharp boundaries, the distortion of the edge of the OSD object can be visually unappealing.

SUMMARY

Methods, systems and computer program products are described for interpolating a pixel value of a pixel located at an OSD object during frame rate conversion. In an aspect, a method includes determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames. The method also includes determining, in the current video frame, that a first block adjoining a target block includes a plurality of pixels depicting at least a portion of an OSD object. In an embodiment, the determining is based on the current, and the at least one other set of forward motion vectors associated with the first adjoining block. A current forward motion vector associated with the target block is identified and the method includes determining that a position of the first adjoining block relative to the target block coincides with a direction of the current forward motion vector associated with the target block. The method includes setting a magnitude of the current forward motion vector associated with the target block to zero (0), and calculating a pixel value of a pixel in the target block in the interpolated video frame based on the current forward motion vector associated with the target block.

In another aspect, a system for interpolating a pixel value of a pixel located at an OSD object during frame rate conversion includes a forward motion vector component configured for determining, current forward motion vectors between a first previous video frame and a current video frame, and at least one other set of forward motion vectors between two temporally consecutive previous video frames. The system also includes an OSD object detection component configured for determining, in the current video frame, that a first block adjoining a target block includes a plurality of pixels depicting at least a portion of an OSD object, the determining based on the current, and the at least one other set of forward motion vectors associated with the first adjoining block, and an OSD object processing component configured for identifying a current forward motion vector associated with the target block, for determining that a position of the first adjoining block relative to the target block coincides with a direction of the current forward motion vector associated with the target block, and for setting a magnitude of the current forward motion vector associated with the target block to zero (0). The system also includes a pixel interpolator component configured for calculating a pixel value of a pixel in the target block in the interpolated video frame based on the current forward motion vector associated with the target block.

In another aspect, a system for interpolating a pixel value of a pixel located at an OSD object during frame rate conversion includes means for determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames, means for determining, in the current video frame, that a first block adjoining a target block includes a plurality of pixels depicting at least a portion of an OSD object, the determining based on the current, and the at least one other set of forward motion vectors associated with the first adjoining block, means for identifying a current forward motion vector associated with the target block, and for determining that a position of the first adjoining block relative to the target block coincides with a direction of the current forward motion vector associated with the target block, means for setting a magnitude of the current forward motion vector associated with the target block to zero (0), and means for calculating a pixel value of a pixel in the target block in the interpolated video frame based on the current forward motion vector of the first set of forward motion vectors associated with the target block.

In another aspect, a computer readable medium storing a computer program, executable by a machine, for interpolating a pixel value of a pixel located at an OSD object during frame rate conversion is defined. The computer program comprises executable instructions for determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames, determining, in the current video frame, that a first block adjoining a target block includes a plurality of pixels depicting at least a portion of an on-screen display (OSD) object, the determining based on the current, and the at least one other set of forward motion vectors associated with the first adjoining block, identifying a current forward motion vector associated with the target block and determining that a position of the first adjoining block relative to the target block coincides with a direction of the current forward motion vector associated with the target block, setting a magnitude of the current forward motion vector associated with the target block to zero (0), and calculating a pixel value of a pixel in the target block in the interpolated video frame based on the current forward motion vector associated with the target block.

DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides for interpolating a pixel value of a pixel located at an OSD object during frame rate conversion. Typically, during frame rate conversion, additional video frames between a previous video frame and a current video frame can be interpolated using forward motion vectors between a plurality of contiguous blocks in the previous video frame and a plurality of contiguous blocks in the current video frame. For example, for a block in an interpolated frame, an interpolated pixel value in the block can be determined from a scaled forward motion vector corresponding to the block, and from a pixel value in the previous video frame.

Nonetheless, when the frame content includes one or more OSD objects, normal pixel interpolation using scaled forward motion vectors for blocks located at an OSD object can result in blurring of the OSD object edge. In these circumstances, such distortions can be distracting to the viewer and can diminish the viewing experience.

According to aspects disclosed herein, pixel interpolation of pixels in a block located at an OSD object is based on a direction of a forward motion vector associated with the block. In particular, when the direction of the forward motion vector indicates that the content in the block can blur an edge of the OSD object, the forward motion vector is set to zero (0). By setting the forward motion vector to zero (0), the content in the block associated with the forward motion vector remains stationary and the sharp edge of the OSD object is preserved. Accordingly, visual artifacts at the edge of the OSD object are reduced.

Figure 1A:
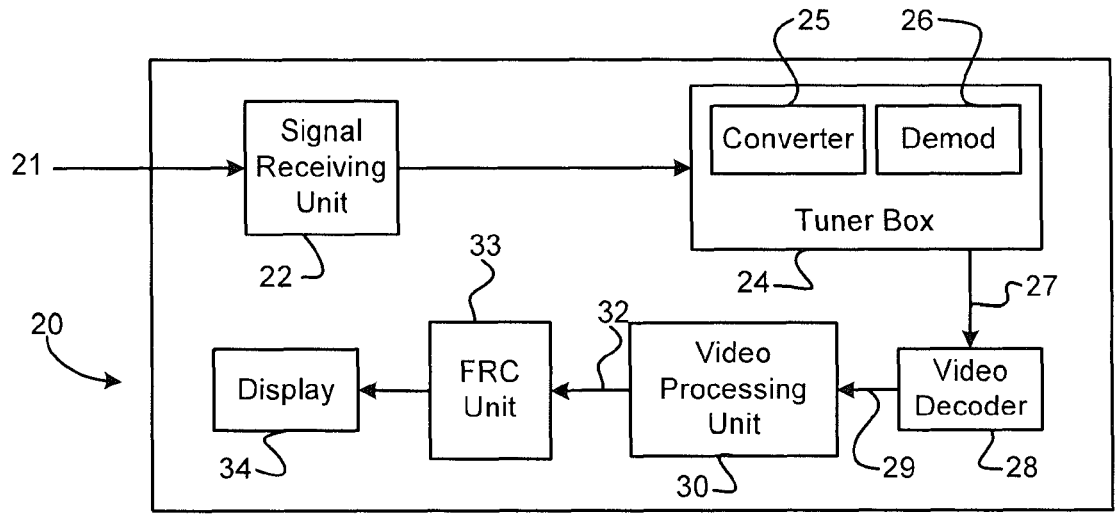
FIG. 1A illustrates a conventional progressive video signal display system.
Figure 1B:
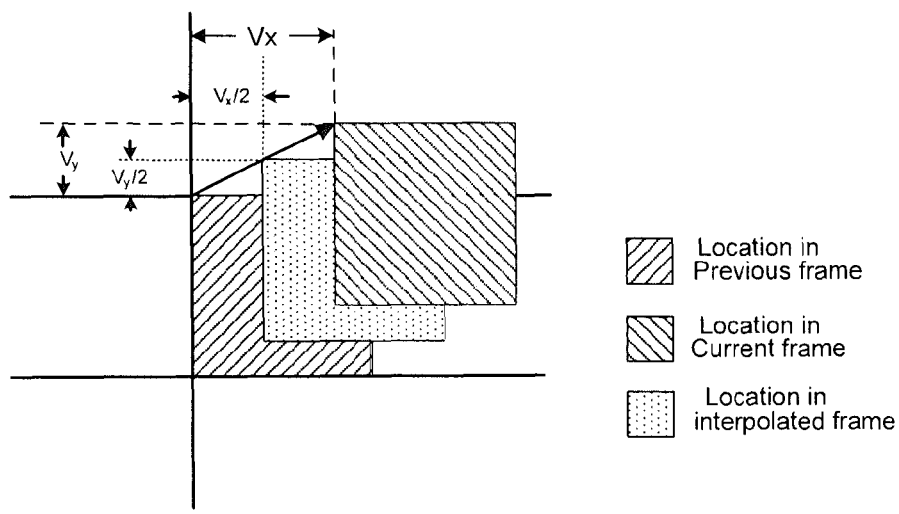
FIG. 1B depicts an exemplary block of pixels in previous, current and interpolated positions in a video frame.

According to an embodiment, the subject matter presented herein can be implemented in the exemplary display system illustrated in FIG. 1A and described above. Those of ordinary skill in the art will appreciate that the components illustrated in FIG. 1A may vary depending on the system implementation. It should also be understood that the arrangement of the system illustrated in FIG. 1A is but one possible implementation and that other arrangements are possible. It should also be understood that the various system components defined by the claims, described below, and illustrated in the various block diagrams represent logical components that are configured to perform the functionality described herein. For example, one or more of these system components can be realized, in whole or in part, by at least some of the components illustrated in the arrangement of the display system.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1A. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
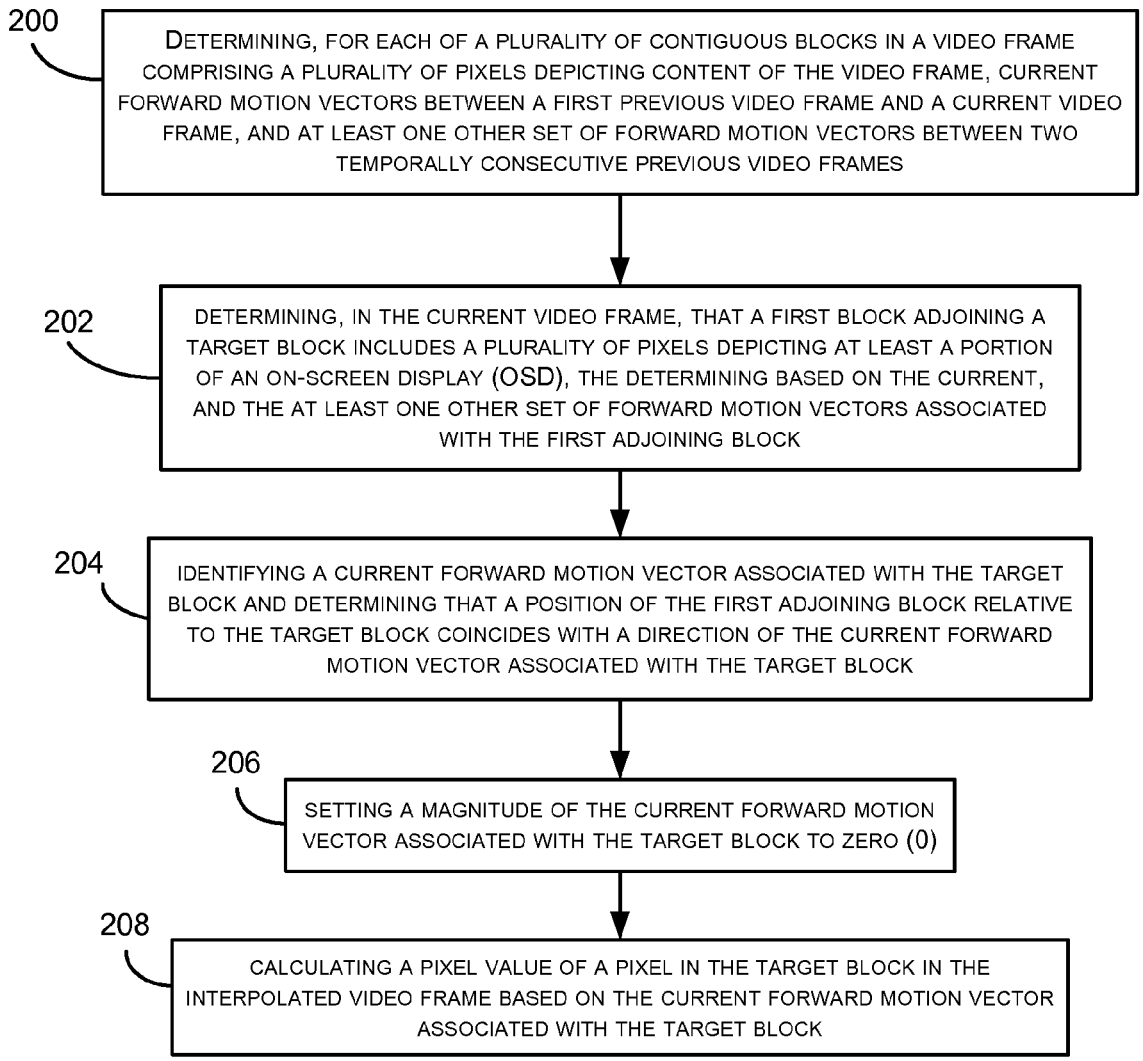
FIG. 2 is a flow diagram illustrating a method for interpolating a pixel value of a pixel located at an OSD object during frame rate conversion according to one embodiment.
Figure 3:
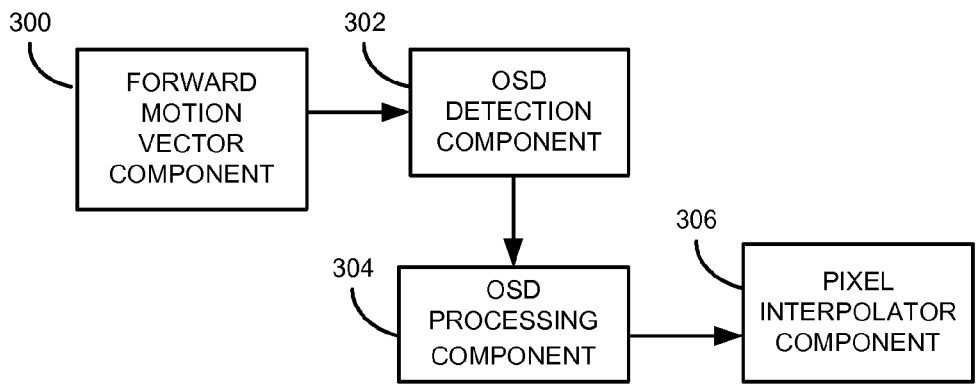
FIG. 3 is a block diagram illustrating a for interpolating a pixel value of a pixel located at an OSD object during frame rate conversion according to one embodiment.
Figure 4:
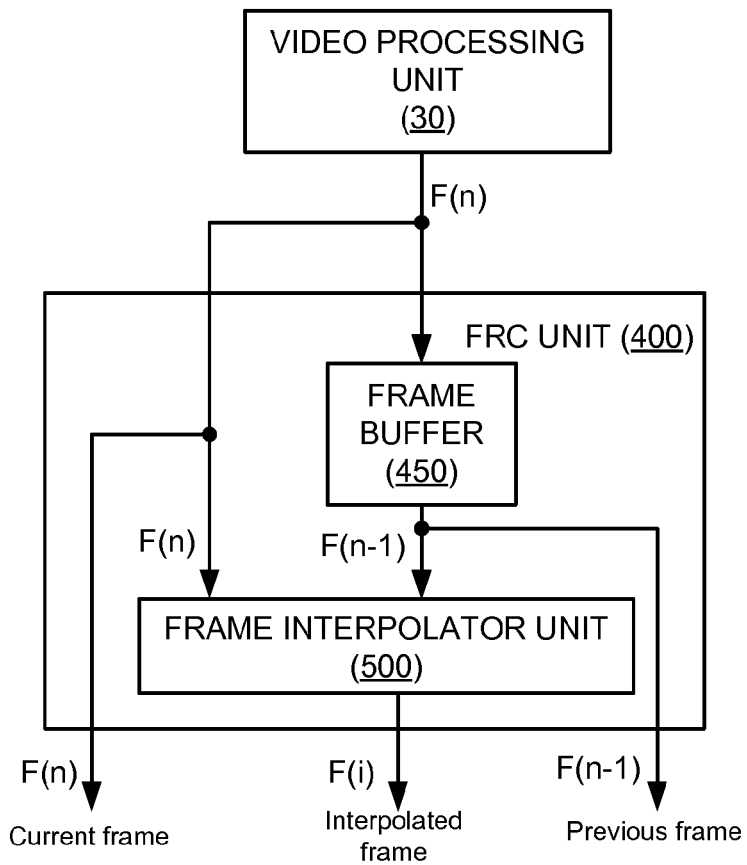
FIG. 4 is a block diagram illustrating another system for interpolating a pixel value of a pixel located at an OSD object during frame rate conversion according to one embodiment.
Figure 5:
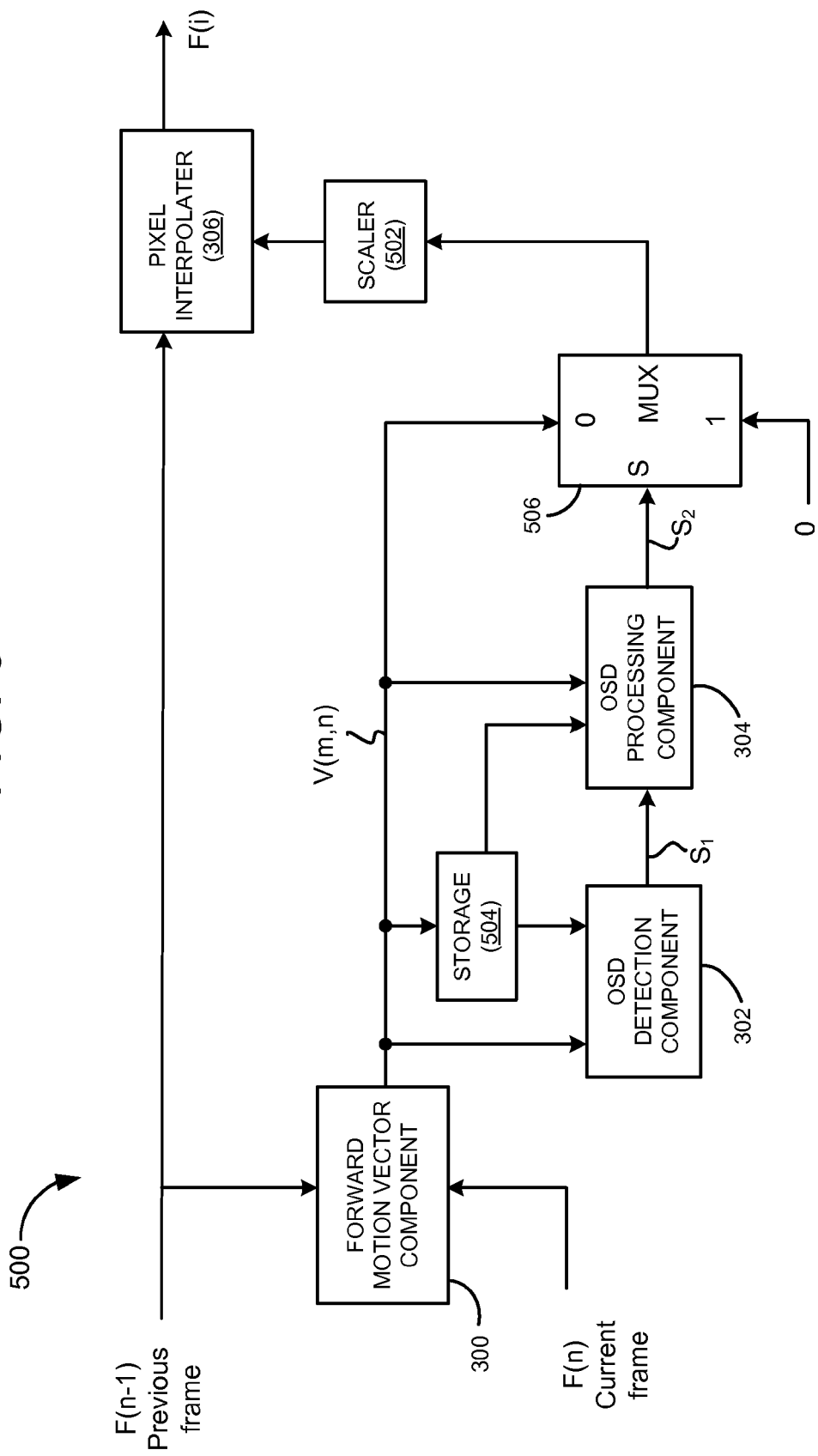
FIG. 5 is a block diagram illustrating another system for interpolating a pixel value of a pixel located at an OSD object during frame rate conversion according to one embodiment.

Referring now to FIG. 2, a flow diagram is presented illustrating a method for interpolating a pixel value of a pixel located at an OSD object during frame rate conversion according to an exemplary embodiment. FIGS. 3, 4 and 5 are block diagrams illustrating systems for interpolating a pixel value of a pixel located at an OSD object according to embodiments of the subject matter described herein. In particular, FIG. 3 illustrates an arrangement of components configured for interpolating a pixel value of a pixel located at an OSD object in during frame rate conversion, while FIG. 4 illustrates an exemplary frame rate conversion unit 400 in a display device that includes a frame interpolator unit 500, and FIG. 5 illustrates the components of FIG. 3 and/or their analogs adapted for operation in the frame interpolator unit 500 in the rate conversion unit 400. The method illustrated in FIG. 2 can be carried out by, for example, at least some of the components in each of the exemplary arrangements of components illustrated in FIGS. 3, and 5.

Illustrated in FIG. 4 is an FRC unit 400 that receives a progressive video output signal 32 corresponding to pixels in a current de-interlaced video frame, F(n). The FRC unit 400 includes, in an embodiment, a frame buffer 450 that outputs the progressive video output signal corresponding to pixels in a previous video frame, F(n−1). In an embodiment, the current video frame, F(n), and previous video frame, F(n−1), are received by a frame interpolator unit 500 configured to interpolate pixels in an interpolated frame, F(i), temporally located between the current, F(n), and previous, F(n−1), video frames. FIG. 5 is a block diagram illustrating an exemplary frame interpolator unit 500 that includes the components of FIG. 3 and/or their analogs.

With reference to FIG. 2, the method begins, in block 200, by determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames. In an embodiment, a system for interpolating a pixel value of a pixel located at an OSD object in an interpolated video frame during frame rate conversion includes means for determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames. For example, FIG. 3 illustrates a forward motion vector component 300 configured to perform this function.

Figure 6:
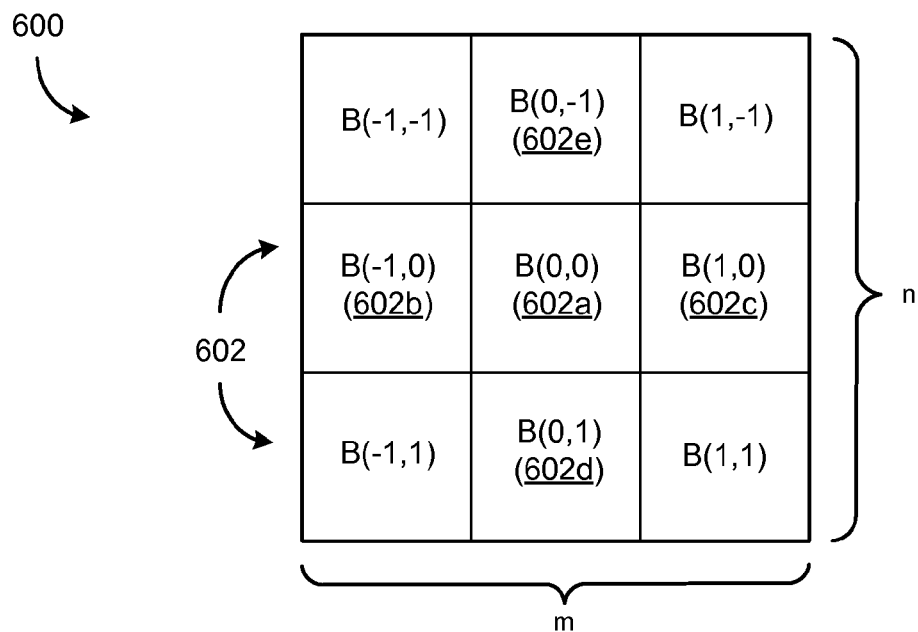
FIG. 6 is a block diagram illustrating a portion of a representation of a video frame according to an embodiment.

According to an embodiment, the forward motion vector (FMV) component 300 can be configured to divide each received video frame, e.g., the previous and current video frames, into a plurality of contiguous blocks, as shown in FIG. 6. For example, a video frame 600 can be divided into m×n blocks 602, and each block 602 can be located in the frame by coordinates B (m, n). Each block can comprise a matrix of 16×16 pixels that present content of the video frame.

For each block in the current frame, F(n), the FMV component 300 can be configured to determine a current forward motion vector between a block in the previous frame, F(n−1), and a block in the current frame, F(n). The block in the current frame can be identified by comparing the pixel values in a block in the previous frame with pixel values in the blocks in the current frame. When a block in the current frame includes pixel values that "match" those pixel values in the block in the previous frame, a forward motion vector pointing from the block in the previous frame to the matching block in the current frame can be generated. For example, a forward motion vector can be determined, in an embodiment, by calculating an absolute difference between each pixel in a block in a previous frame and each corresponding pixel in a block in a current frame, and then calculating a sum of the absolute differences (SAD). The current forward motion vector for the block can be based on the block having the smallest SAD.

In an embodiment, a target block, B(0,0) 602a, is identified and each adjoining block, e.g., 602b-602e, is assigned a relative coordinate. For example, B (m, n) can identify a block "m" blocks away in a horizontal direction and "n" blocks away in a vertical direction in relation to the target block, B (0,0) 602a. In an embodiment, a vector scaler component 502 in the frame interpolator unit 500 can be configured to receive the forward motion vector for each block, B(m, n), and to calculate a scaled motion vector. For example, if V(m,n) is the forward motion vector for a block 602, e.g., B(m,n), and $V_x$ and $V_y$ are vector components for V(m,n), then $$SV_x = V_x \times Scale$$

$$SV_y = V_y \times Scale$$

where $SV_x$ and $SV_y$ are the scaled vector components, Scale=$N_k/(F_a+1)$, $F_a$ is the total number of frames that need be interpolated, and $N_k$ is the $k^{th}$ interpolated frame.

In an embodiment, the pixel interpolation unit 500 can include a pixel interpolator component 306 configured for receiving the scaled forward motion vector components of a current forward motion vector and for calculating the interpolated value for a pixel in an interpolated video frame based on pixel values in the previous video frame, F(n−1). For example, using the scaled forward motion vector components, a pixel in a block having corner origin coordinates ($x_0$, $y_0$) in the current frame can be interpolated into the interpolated frame by using the following equation:

$$D(x_0+SV_x+i, y_0+SV_y+j) = S_p(x_0+V_x+i, y_0+V_y+j)$$

where 0≦i≦block width, e.g., 16, 0≦j≦block height, e.g., 16, and $S_p$ is the pixel value of the pixel at ($x_0$+i, $y_0$+j) in the previous video frame.

Referring again to FIG. 2, the exemplary method continues, in block 202, by determining, in the current video frame, that a first block adjoining a target block includes a plurality of pixels depicting at least a portion of an OSD object. In an embodiment, the determination is based on the current forward motion vector, and the at least one other set of forward motion vectors associated with the first adjoining block. According to an embodiment, a system for interpolating a pixel value of a pixel located at an OSD object in an interpolated video frame during frame rate conversion includes means for determining, in the current video frame, that a first block adjoining a target block includes a plurality of pixels depicting at least a portion of an OSD object. For example, FIG. 3 illustrates an OSD object detection component 302 configured for determining, in the current video frame, that a first block adjoining a target block includes a plurality of pixels depicting at least a portion of an OSD object, the determining based on the current, and the at least one other set of forward motion vectors associated with the first adjoining block.

According to an embodiment, the OSD object detection component 302 can be configured for determining that the first adjoining block 602b includes an OSD object by analyzing a first adjoining block's, e.g., 602b, forward motion vectors for the current, first previous and second previous video frames. In other words, the at least one other set of forward motion vectors can include, in an embodiment, a second set of forward motion vectors between a second previous video frame and the first previous video frame, and a third set of forward motion vectors between a third previous video frame and the second previous video frame. As described above, the forward motion vector for a block 602 in a video frame comprises a magnitude and direction, that generally indicate how and to what extent content in the block 602 moves between consecutive video frames. When an object in a block 602 is moving, the absolute value of the magnitude of the associated forward motion vector is relatively large, e.g., greater than at least one block width. Alternatively, when the object is not moving, i.e., the object is stationary, the magnitude of the associated forward motion vector is relatively small, e.g., less than one quarter of the block size, i.e., 4 when the block size is 16.

In an embodiment, the forward motion vectors determined by the FMV component 300 can be stored, e.g., in a storage mechanism 504, and the OSD object detection component 302 can be configured for retrieving the forward motion vector(s) associated with the first adjoining block 602b from the at least one other set(s), e.g., the second and/or third sets, of forward motion vectors when the current forward motion vector is received. Because an OSD object is typically stationary across several video frames, the OSD object detection component 302 can be configured for determining that the first adjoining block 602b includes pixels depicting at least a portion of the OSD object when an absolute value of the magnitude of the current the at least one other set of forward motion vectors associated with the first adjoining block do not exceed an OSD threshold value. In an embodiment, the OSD threshold value can be at least zero (0) and at most one quarter the block size.

According to an embodiment, more than the current, second and/or third sets of forward motion vectors can be analyzed in determining that the first adjoining block 602b includes pixels depicting at least a portion of the OSD object. Alternatively, the OSD object detection component 302 can make a determination based on the current and second set of forward motion vectors. In yet another embodiment, the OSD object detection component 302 can make an initial determination based on the current and second set of forward motion vectors, and then retrieve another set, e.g, the third set, to make a final determination when the current and second set of forward motion vectors do not exceed the OSD threshold value. Various combinations can be implemented to determine that the first adjoining block 602b includes pixels depicting at least a portion of the OSD object, and the scope of the disclosure is not limited to the examples described herein.

According to an embodiment, when the first adjoining block 602b does not include pixels depicting at least a portion of the OSD object, e.g., when the current and the at least one other set of forward motion vectors exceeds the OSD threshold value, the OSD object detection component 302 can be configured for transmitting a signal indicating that an OSD object has not been detected in the first adjoining block 602b. Otherwise, when the first adjoining block 602b includes pixels depicting at least a portion of the OSD object, the OSD object detection component 302 can be configured for transmitting a second signal indicating that an OSD object has been detected in the first adjoining block 602b.

Referring again to FIG. 2, when a first block 602b adjoining a target block 602a includes a plurality of pixels depicting at least a portion of an OSD object, the exemplary method continues, in block 204, by identifying a current forward motion vector associated with the target block and determining that a position of the first adjoining block relative to the target block coincides with a direction of the current forward motion vector associated with the target block. According to an embodiment, a system for interpolating a pixel value of a pixel located at an OSD object during frame rate conversion includes means for identifying a current forward motion vector associated with the target block and determining that a position of the first adjoining block relative to the target block coincides with a direction of the current forward motion vector associated with the target block. For example, FIG. 3 illustrates an OSD object processing component 304 configured for performing this function.

According to an embodiment, the OSD object processing component 304 can be configured for receiving the signal, $S_1$, from the OSD object detection component 302 for the first block, e.g., 602b, adjoining the target block, e.g., 602a, in the current video frame. When the received signal, $S_1$, indicates that an OSD object has been detected in the first adjoining block 602b, the OSD object processing component 304 can be configured for identifying a current forward motion vector associated with the target block 602a. In an embodiment, the current forward motion vector can be identified by receiving the vector from the FMV component 300. Alternatively or additionally, the current forward motion vector can be identified by retrieving the vector from the storage mechanism 504. Once the current forward motion vector is identified, the OSD object processing component 304 can be configured for determining whether a direction of the forward motion vector associated with the target block 602a coincides with a position of the first adjoining block, e.g., 602b, relative to the target block 602a.

For example, as described above, the current forward motion vector, V(m,n), associated with a block 602 in a video frame comprises a horizontal vector component, $V_x$, and a vertical vector component, $V_y$, that represents a direction of the current forward motion vector. In an embodiment, a position of an adjoining block relative to a target block coincides with a direction of the forward motion vector associated with the target block when the vertical vector component, $V_y$, and/or the horizontal vector component, $V_x$, of the forward motion vector point to the position of the adjoining block. For example, the position of the first adjoining block relative to the target block 602a coincides with the direction of the forward motion vector associated with the target block 602a when the first block, e.g., 602b, adjoins a left side of the target block 602a and the direction of the horizontal vector component of the forward motion vector associated with the target block 602a is negative. Alternatively, when the first block, e.g., 602c, adjoins a right side of the target block 602a, and the direction of the horizontal vector component of the forward motion vector associated with the target block 602a is positive, the adjoining block's position coincides with the direction of the forward motion vector associated with the target block 602a.

Alternatively, the position of the first adjoining block relative to the target block 602a coincides with the direction of the forward motion vector associated with the target block 602a when the first block, e.g., 602e, adjoins a top side of the target block 602a and the direction of the vertical vector component of the forward motion vector associated with the target block 602a is negative. Alternatively, when the first block, e.g., 602d, adjoins a bottom side of the target block 602a, and the direction of the vertical vector component of the forward motion vector associated with the target block 602a is positive, the adjoining block's position coincides with the direction of the forward motion vector associated with the target block 602a.

Referring again to FIG. 2, when the position of the first adjoining block relative to the target block 602a coincides with the direction of the current forward motion vector associated with the target block 602a, a magnitude of the current forward motion vector associated with the target block 602a is set to zero (0) in block 206. According to an embodiment, a system for interpolating a pixel value of a pixel located at an OSD object during frame rate conversion includes means for setting a magnitude of the current forward motion vector associated with the target block to zero (0). For example, the OSD object processing component 304 can be configured for performing this function.

According to an embodiment, when the position of the first adjoining block relative to the target block 602a coincides with the direction of the current forward motion vector associated with the target block 602a, the OSD object processing component 304 can be configured for transmitting a signal indicating that the magnitude of the current forward motion vector associated with the target block 602a be set to zero (0). Otherwise, when the position of the first adjoining block relative to the target block 602a does not coincide with the direction of the current forward motion vector, and/or when the received signal, $S_1$, indicates that an OSD object has not been detected in the first adjoining block 602b, the OSD object processing component 304 can be configured for transmitting a second signal indicating that the magnitude of the current forward motion vector associated with the target block 602a remain the magnitude determined by the FMV component 300.

In an embodiment, a multiplexer component 506 can be configured for receiving, as inputs, the signal, $S_2$, from the OSD object processing component 304, the determined current forward motion vector associated with the target block 602a, and zero (0). Depending on the indication associated with the received signal, $S_2$, the multiplexer component 506 can be configured for outputting the current forward motion vector associated with the target block 602a having a magnitude determined by the FMV component 300 or having a magnitude of zero (0). The outputted forward motion vector can be received by the vector scaler component 502, which can be configured for calculating the scaled motion vector for the target block 602a in an interpolated video frame.

Referring again to FIG. 2, in block 208, the process includes calculating a pixel value of a pixel in the target block in the interpolated video frame based on the current forward motion vector associated with the target block. According to an embodiment, a system for interpolating a pixel value of a pixel located at an OSD object during frame rate conversion includes means for calculating a pixel value of a pixel in the target block in the interpolated video frame based on the current forward motion vector associated with the target block. For example, the pixel interpolator component 306 can be configured for performing this function.

As described above, the pixel interpolator component 306 can be configured for receiving the scaled forward motion vector associated with the target block 602a and for calculating the pixel value for a pixel in the target block 602a in the interpolated video frame based on pixel values in the previous video frame, F(n−1). The pixel in the target block 602a having corner origin coordinates $(x_0, y_0)$ in the current frame can be interpolated into the interpolated frame by using the following equation:

$$D(x_0+SV_x+i, y_0+SV_y+j)=S_p(x_0+V_x+i, y_0+V_y+j)$$

where $0 \leq i \leq$ block width, e.g., 16, $0 \leq j \leq$ block height, e.g., 16, and $S_p$ is the pixel value of the pixel at $(x_0+i, y_0+j)$ in the previous video frame.

When the magnitude of the forward motion vector associated with the target block 602a is zero (0), the interpolated pixel for the pixel in the target block 602a in the interpolated video frame remains unchanged. In other words, the content presented in the target block 602a remains stationary in the interpolated video frames. Accordingly, the content does not interfere with the OSD object included in the first adjoining block 602b and a sharp edge of the OSD object can be preserved, thereby reducing undesirable visual artifacts at the edge of the OSD object.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for interpolating a pixel value of a pixel located at an on-screen display (OSD) object during frame rate conversion, the method comprising:
    determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames;
    determining, in the current video frame, that a first block adjoining a target block includes a plurality of pixels depicting at least a portion of an on-screen display (OSD) object, the determining based on the current, and the at least one other set of forward motion vectors associated with the first adjoining block;
    identifying a current forward motion vector associated with the target block and determining that a position of the first adjoining block relative to the target block coincides with a direction of the current forward motion vector associated with the target block;
    setting a magnitude of the current forward motion vector associated with the target block to zero (0); and
    calculating a pixel value of a pixel in the target block in the interpolated video frame based on the current forward motion vector associated with the target block;
    wherein at least one of the preceding actions is performed on at least one electronic hardware component.

2. The method of claim 1 wherein the at least one other set of forward motion vectors includes a second set of forward motion vectors between a second previous video frame and the first previous video frame, and a third set of forward motion vectors between a third previous video frame and the second previous video frame.

3. The method of claim 1 wherein the first adjoining block includes a plurality of pixels depicting at least a portion of the OSD object when an absolute value of the magnitude of the current and the at least one other set of forward motion vectors associated with the first adjoining block do not exceed an OSD threshold value.

4. The method of claim 3 wherein each of the plurality of blocks comprises a block size and wherein the OSD threshold value is at least zero (0) and at most one quarter of the block size.

5. The method of claim 1 wherein the forward motion vector comprises a vertical vector component and a horizontal vector component.

6. The method of claim 5 wherein the position of the first adjoining block relative to the target block coincides with the direction of the current forward motion vector associated with the target block when one of: the first block adjoins a left side of the target block and a direction of the horizontal vector component of the current forward motion vector associated with the target block is negative; and the first block adjoins a right side of the target block and a direction of the horizontal vector component of the current forward motion vector associated with the target block is positive.

7. The method of claim 5 wherein the position of the first adjoining block relative to the target block coincides with the direction of the current forward motion vector associated with the target block when one of: the first block adjoins a top side of the target block and a direction of the vertical vector component of the current forward motion vector associated with the target block is negative; and the first block adjoins a bottom side of the target block and a direction of the vertical vector component of the current forward motion vector associated with the target block is positive.

8. A system for interpolating a pixel value of a pixel located at an on-screen display (OSD) object during frame rate conversion, the system comprising system components including:
    a forward motion vector component configured for determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames;
    an on-screen display (OSD) object detection component configured for determining, in the current video frame, that a first block adjoining a target block includes a plurality of pixels depicting at least a portion of an OSD object, the determining based on the current forward motion vector, and the at least one other set of forward motion vectors associated with the first adjoining block;
    an OSD object processing component configured for identifying a current forward motion vector associated with the target block, for determining that a position of the first adjoining block relative to the target block coincides with a direction of the current forward motion vector associated with the target block, and for setting a magnitude of the current forward motion vector associated with the target block to zero (0); and
    a pixel interpolator component configured for calculating a pixel value of a pixel in the target block in the interpolated video frame based on the current forward motion vector associated with the target block,
    wherein at least one of the system components includes at least one electronic hardware component.

9. The system of claim 8 wherein the at least one other set of forward motion vectors includes a second set of forward motion vectors between a second previous video frame and the first previous video frame, and a third set of forward motion vectors between a third previous video frame and the second previous video frame.

10. The system of claim 8 wherein the first adjoining block includes a plurality of pixels depicting at least a portion of the OSD object when an absolute value of the magnitude of the current and the at least one other set of forward motion vectors associated with the first adjoining block do not exceed an OSD threshold value.

11. The system of claim 10 wherein each of the plurality of blocks comprises a block size and wherein the OSD threshold value is at least zero (0) and at most one quarter of the block size.

12. The system of claim 8 wherein the forward motion vector comprises a vertical vector component and a horizontal vector component.

13. The system of claim 12 wherein the position of the first adjoining block relative to the target block coincides with the direction of the current forward motion vector associated with the target block when one of: the first block adjoins a left side of the target block and a direction of the horizontal vector component of the current forward motion vector associated with the target block is negative; and the first block adjoins a right side of the target block and a direction of the horizontal vector component of the current forward motion vector associated with the target block is positive.

14. The system of claim 12 wherein the position of the first adjoining block relative to the target block coincides with the direction of the current forward motion vector associated with the target block when one of: the first block adjoins a top side of the target block and a direction of the vertical vector component of the current forward motion vector associated with the target block is negative; and the first block adjoins a bottom side of the target block and a direction of the vertical vector component of the current forward motion vector associated with the target block is positive.

15. A system for interpolating a pixel value of a pixel located at an on-screen display (OSD) object during frame rate conversion, the system comprising system components including:
    means for determining, for each of a plurality of contiguous blocks in a video frame comprising a plurality of pixels depicting content of the video frame, current forward motion vectors between a first previous video frame and a current video frame, and at least one other set of forward motion vectors between two temporally consecutive previous video frames;
    means for determining, in the current video frame, that a first block adjoining a target block includes a plurality of pixels depicting at least a portion of an OSD object, the determining based on the current, and the at least one other set of forward motion vectors associated with the first adjoining block;
    means for identifying a current forward motion vector associated with the target block, and for determining that a position of the first adjoining block relative to the target block coincides with a direction of the current forward motion vector associated with the target block; means for setting a magnitude of the current forward motion vector associated with the target block to zero (0); and
    means for calculating a pixel value of a pixel in the target block in the interpolated video frame based on the current forward motion vector associated with the target block,
    wherein at least one of the means includes at least one electronic hardware component.

* * * * *